(12) United States Patent
Uchiyama et al.

(10) Patent No.: US 8,498,537 B2
(45) Date of Patent: Jul. 30, 2013

(54) OPTICAL CROSS-CONNECT APPARATUS

(75) Inventors: Yasuhiro Uchiyama, Dunwoody, GA (US); Yasuyuki Fukashiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 280 days.

(21) Appl. No.: 12/827,162

(22) Filed: Jun. 30, 2010

(65) Prior Publication Data

US 2011/0008041 A1    Jan. 13, 2011

(30) Foreign Application Priority Data

Jul. 10, 2009    (JP) .................................. 2009-163708

(51) Int. Cl.
*H04B 10/08*    (2006.01)
*H04J 14/00*    (2006.01)

(52) U.S. Cl.
USPC ................... 398/48; 398/17; 398/30; 398/33; 398/50

(58) Field of Classification Search
USPC .............................. 398/17, 30, 31, 45, 48–50
See application file for complete search history.

(56) References Cited

U.S. PATENT DOCUMENTS

| 6,728,207 | B1 * | 4/2004 | Askinger et al. ............... 370/224 |
| 7,123,404 | B1 | 10/2006 | Mori et al. |
| 7,711,270 | B2 * | 5/2010 | Ooi et al. ....................... 398/175 |
| 2004/0120706 | A1 * | 6/2004 | Johnson et al. .................. 398/10 |
| 2004/0208520 | A1 * | 10/2004 | Palacharla et al. .............. 398/30 |

FOREIGN PATENT DOCUMENTS

| JP | 2001-230732 A | 8/2001 |
| JP | 2006-140598 A | 6/2006 |
| JP | 2006-262365 A | 9/2006 |
| JP | 2007-095961 A | 4/2007 |

* cited by examiner

*Primary Examiner* — Dalzid Singh
(74) *Attorney, Agent, or Firm* — Mattingly & Malur, PC

(57) ABSTRACT

The present invention relates to an optical cross-connect apparatus supporting plural directions, and provides a method of effectively performing an alarm indication by a node supervisory unit of the optical cross-connect apparatus. The node supervisory unit includes an alarm indication information storage unit that manages a management table for each of the plural directions. The management table manages not only received alarm indication information but also "internal WSS input/output port optical fiber connection state", "WSS optical path setting state on DROP/THROUGH selection side", "transponder destination location", and "destination direction", with respect to each direction. Then, a process flow is added to match received FDI information with the management information stored in the management table for each direction, and to specify an alarm destination.

6 Claims, 17 Drawing Sheets

FIG. 3
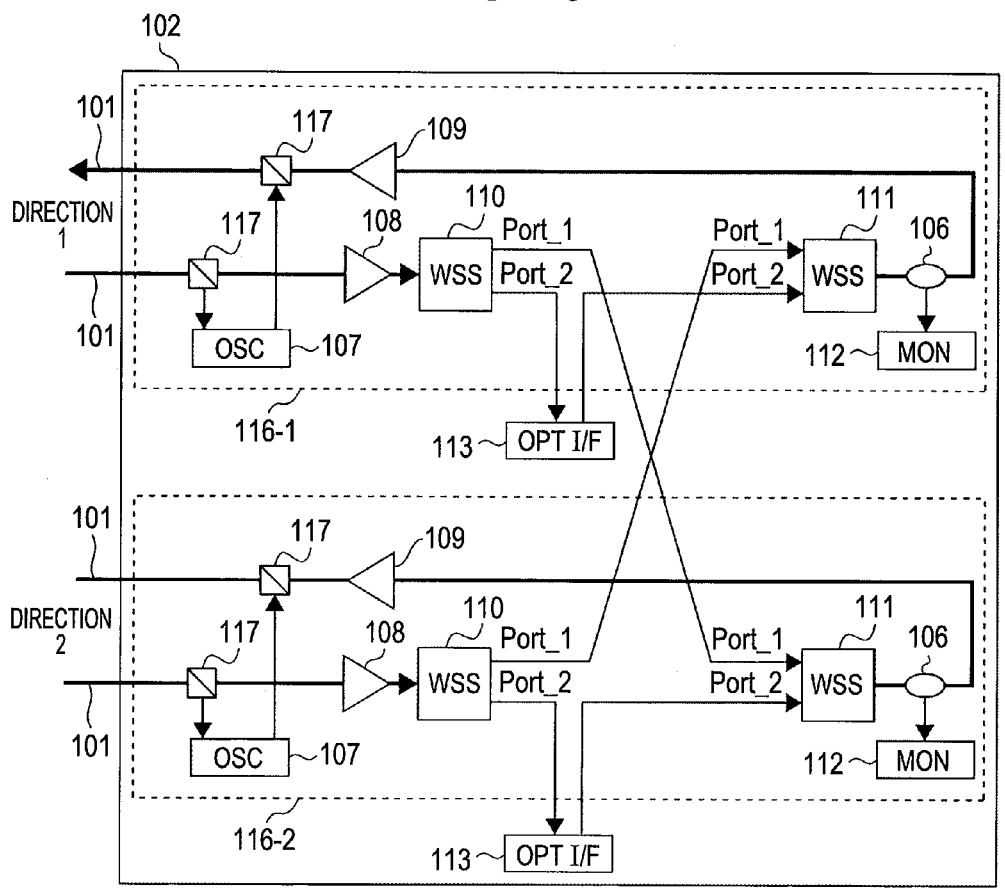
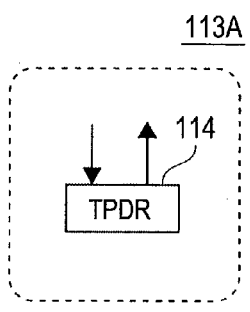
FIG. 4A
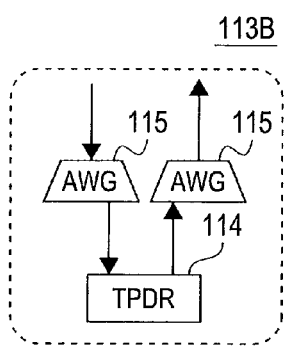
FIG. 4B
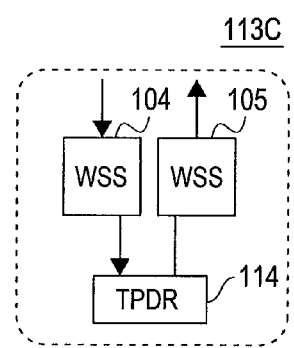
FIG. 4C

| 321 | 322 | 323 | 324 | 325 | 326 |
|---|---|---|---|---|---|
| 1×4 WSS DIRECTION | PORT | WAVELENGTH | 1×4 WSS PASS SETTING | 4×1 WSS PASS SETTING | TRANSPONDER DESTINATION LOCATION |
| DIRECTION 1 | Port_1 | λ1 | THROUGH | THROUGH | — |
| | | λ2 | OFF | OFF | — |
| | | λ3 | OFF | OFF | — |
| | | ... | ... | ... | ... |
| | | ... | ... | ... | ... |
| | | λm | OFF | OFF | — |
| | Port_2 | λ1 | OFF | OFF | — |
| | | λ2 | OFF | OFF | — |
| | | λ3 | OFF | OFF | — |
| | | ... | ... | ... | ... |
| | | ... | ... | ... | ... |
| | | λm | OFF | OFF | — |
| | Port_3 | λ1 | OFF | OFF | — |
| | | λ2 | OFF | OFF | — |
| | | λ3 | OFF | OFF | — |
| | | ... | ... | ... | ... |
| | | ... | ... | ... | ... |
| | | λm | OFF | OFF | — |
| | Port_4 | λ1 | OFF | OFF | — |
| | | λ2 | OFF | OFF | — |
| | | λ3 | OFF | OFF | — |
| | | ... | ... | ... | ... |
| | | ... | ... | ... | ... |
| | | λm | OFF | OFF | — |
| DIRECTION 2 | ... | | | | |
| DIRECTION 3 | ... | | | | |
| DIRECTION 4 | ... | | | | |

| 1×4 WSS DIRECTION (331) | PORT (332) | WAVELENGTH (333) | 1×4 OPTICAL SWITCH PATH SETTING (334) | INTERNAL OPTICAL FIBER DESTINATION DIRECTION (335) | TRANSPONDER DESTINATION LOCATION (336) | FDI RECEPTION (337) |
|---|---|---|---|---|---|---|
| DIRECTION 1 | PORT 1 | λ1 | THROUGH | DIRECTION 2 | — | ✓ |
| | | λ2 | OFF | | — | — |
| | | λ3 | OFF | | — | — |
| | | ... | ... | | ... | ... |
| | | ... | ... | | ... | ... |
| | | λm | OFF | | — | — |
| | PORT 2 | λ1 | OFF | DIRECTION 3 | — | — |
| | | λ2 | OFF | | — | — |
| | | λ3 | OFF | | — | — |
| | | ... | ... | | ... | ... |
| | | ... | ... | | ... | ... |
| | | λm | OFF | | — | — |
| | PORT 3 | λ1 | OFF | DIRECTION 4 | — | — |
| | | λ2 | OFF | | — | — |
| | | λ3 | OFF | | — | — |
| | | ... | ... | | ... | ... |
| | | ... | ... | | ... | ... |
| | | λm | OFF | | — | — |
| | PORT 4 | λ1 | OFF | — | — | — |
| | | λ2 | OFF | | — | — |
| | | λ3 | OFF | | — | — |
| | | ... | ... | | ... | ... |
| | | ... | ... | | ... | ... |
| | | λm | OFF | | — | — |
| DIRECTION 2 | | | | | | |
| DIRECTION 3 | | | | | | |
| DIRECTION 4 | | | | | | |

FIG. 17

| 1×4 OPTICAL SWITCH DIRECTION (331A) | PORT (332) | WAVELENGTH (333) | 1×4 OPTICAL SWITCH PATH SETTING (334A) | INTERNAL OPTICAL FIBER DESTINATION DIRECTION (335) | TRANSPONDER DESTINATION LOCATION (336) | FDI RECEPTION (337) |
|---|---|---|---|---|---|---|
| DIRECTION 1 | PORT 1 | $\lambda 1$ | BRIDGE | DIRECTION 2 | 1-1 | ✓ |
| | | $\lambda 2$ | OFF | | — | — |
| | | $\lambda 3$ | OFF | | — | — |
| | | ... | ... | | ... | ... |
| | | ... | ... | | ... | ... |
| | | $\lambda m$ | OFF | | — | — |
| | PORT 2 | $\lambda 1$ | OFF | DIRECTION 3 | — | — |
| | | $\lambda 2$ | OFF | | — | — |
| | | $\lambda 3$ | OFF | | — | — |
| | | ... | ... | | ... | ... |
| | | ... | ... | | ... | ... |
| | | $\lambda m$ | OFF | | — | — |
| | PORT 3 | $\lambda 1$ | OFF | DIRECTION 4 | — | — |
| | | $\lambda 2$ | OFF | | — | — |
| | | $\lambda 3$ | OFF | | — | — |
| | | ... | ... | | ... | ... |
| | | ... | ... | | ... | ... |
| | | $\lambda m$ | OFF | | — | — |
| | PORT 4 | $\lambda 1$ | OFF | — | — | — |
| | | $\lambda 2$ | OFF | | — | — |
| | | $\lambda 3$ | OFF | | — | — |
| | | ... | ... | | ... | ... |
| | | ... | ... | | ... | ... |
| | | $\lambda m$ | OFF | | — | — |
| DIRECTION N | | | | | | |

330A

OPTICAL CROSS-CONNECT APPARATUS

CLAIM OF PRIORITY

The present application claims priority from Japanese patent application serial no. 2009-163708, filed on Jul. 10, 2009, the content of which is hereby incorporated by reference into this application.

BACKGROUND OF THE INVENTION

The present invention relates to an optical cross-connect apparatus. More particularly, the invention relates to an optical cross-connect apparatus being connected to plural directions and capable of achieving an alarm indication function.

The rapid increase in the data traffic represented by the Internet has brought about large capacity transmission. Such large capacity transmission is realized in a way that the transmission signal is converted from an electrical signal to an optical signal based on time division multiplexing technology and wavelength division multiplexing technology. Currently, transmission equipment supporting 10 Gbits/s, 40 Gbits/s, and 100 Gbits/s per channel has been put into practice. Also, practical point-to-point wavelength multiplexing transmission systems can support long distance transmission over several hundreds of kilometers or more, in a way that a time divided signal of several to several tens of channels is wavelength multiplexed onto a single optical fiber, using an optical amplifier or a regenerative repeater, and the like.

In order to support a further increase in the demand for transmission capacity and to meet the requirements for further economization and diversified services, various network topologies have been introduced, such as a ring optical network in which communication nodes are connected in a closed loop (FIG. 1A), a multi-ring optical network in which plural ring optical networks are connected to each other at a connection point thereof (FIG. 1B), and a mesh optical network in which communication nodes are connected in a mesh shape in order to increase the flexibility in the route selection (FIG. 1C).

The optical transmission equipment used in the ring optical network is called an optical add/drop multiplexer (OADM). The equipment of A, B, C, and D stations in FIG. 1A, or the equipment of A, B, C, E, F, and G stations in FIG. 1B, corresponds to OADM. Further, the node located at the connection point of the multi-ring optical network and node device used in the mesh optical network are called an optical cross-connect (OXC).

Here, FIGS. 1A, 1B, and 1C are described. In FIG. 1A, a ring optical network 210 includes OADM 102 provided in each of A to D stations, and an optical fiber transmission line 101 for connecting each OADM 102 in a ring.

In FIG. 1B, a multi-ring optical network 220 includes OADMs 102 for each of A to C stations, an OXC 103 for D station, OADMs 102 for each of E to G stations, and an optical fiber transmission line 101 for connecting each OADM 102 and the OXC 103 in a ring. The OXC 103 (D station) is a common node to the first ring and the second ring.

In FIG. 1C, a mesh optical network 230 includes OXCs 103 for each of A to D stations and an optical fiber transmission line 101 for connecting each OXC 103 in a mesh form.

Such optical networks can be expected to achieve simplification of the operation of remotely managing node devices by a network supervisory system in a unified manner, facilitation of the end-to-end path management from the start to the end of the circuit by cooperation between the supervisory units of the respective node devices, as well as high speed path setting. Further, the whole network can be realized economically with a configuration that allows optical signals to pass through each node without electrical/optical conversion, based on a sophisticated optical transmission technology.

The OADM 102 and the OXC 103 use an optical switch for ADD/DROP or THROUGH selection of optical signals, and for route switching. A micro-electro-mechanical systems (MEMS) switch, which is currently known as a technology for realizing an optical switch, controls a very small mirror produced by a semiconductor technology using electrostatic power. There is also known a wavelength selective switch (WSS). The WSS has not only a simple switching function but also a wavelength division multiplexing function. In recent years, the WSS has become widely used in networks requiring connection of plural transmission lines as shown in FIGS. 1B and 1C.

Here, the operation of WSS will be briefly described with reference to FIGS. 2A and 2B. In FIG. 2A, Port_C of a 1×N WSS 104 is an input port of the WSS, and Port_1, Port_2, and Port_N are output ports of the WSS. Thus, the 1×N WSS 104 is a device including one input port and N output ports, in which a predetermined control signal is input to the input port and an arbitrary wavelength is output to any one of the ports of Port_1 to Port_N. In the example of FIG. 2A, m wavelength multiplexed signals $\lambda 1, \lambda 2, \lambda 3, \ldots \lambda m$ are input from Port_C. Then, Port_1 outputs $\lambda 1$ and $\lambda 5$, Port_2 outputs $\lambda 2, \lambda 7$, and $\lambda m$, and Port_N outputs $\lambda 4, \lambda 6$, and $\lambda 8$ to $\lambda m-1$. It is to be noted that a particular wavelength, such as $\lambda 3$ in FIG. 2A, can be blocked by the WSS.

In FIG. 2B, an N×1 WSS 105 with N ports input and one port output can also be realized by replacing the operation of the output port and the input port. In the N×1 WSS 105, $\lambda 1$ and $\lambda 5$ are input from Port_1, $\lambda 2, \lambda 7$, and $\lambda m$ are input from Port_2, and $\lambda 4, \lambda 6$, and $\lambda 8$ to $\lambda m-1$ are input from Port_N. Then, a wavelength multiplexed signal having (m−1) wavelengths, $\lambda 1$ and $\lambda 2$ and $\lambda 4$ to $\lambda m$, is output from Port_C.

The configuration of the optical add/drop multiplexer using WSS, as well as the configuration of the optical cross-connect apparatus using WSS are disclosed in JP-A No. 140598/2006, JP-A No. 262365/2006, and the like.

SUMMARY OF THE INVENTION

The present invention relates to an optical cross-connect apparatus supporting three or more directions, and provides an alarm indication method and optical cross-connect apparatus capable of effectively performing an alarm indication.

An effective alarm indication process can be achieved by a node supervisory unit of the optical cross-connect apparatus supporting plural directions. The node supervisory unit includes an alarm indication information storage unit that manages a management table for each of the plural directions. The management table manages not only received alarm indication information but also "internal WSS input/output port optical fiber connection state", "WSS optical path setting state on DROP/THROUGH selection side", "transponder destination location", and "destination direction", with respect to each direction. Then, a process flow is added to match received forward error indication (FDI) information with the management information stored in each management table for each direction, and to specify an alarm destination.

This can be achieved by an optical cross-connect apparatus including a 1×N wavelength selective switch for each of N directions, an N×1 wavelength selective switch for each of the N directions, and a supervisory unit common to each of N directions. The supervisory unit includes an alarm indication information storage unit for storing information about path setting of the 1×N wavelength selective switch, an output direction of the 1×N wavelength selective switch, and a connection destination of the 1×N wavelength selective switch. Upon receiving an FDI alarm, the supervisory unit refers to the alarm indication information storage unit and transfers the FDI alarm.

According to the present invention, even in the optical cross-connect apparatus supporting three or more directions, it is possible to effectively perform a necessary alarm indication without causing a malfunction.

BRIEF DESCRIPTION OF THE DRAWINGS

Preferred embodiments of the present invention will now be described in conjunction with the accompanying drawings, in which;

FIG. 3 is a hardware block diagram relating to a main signal in an optical add/drop multiplexer using WSS optical switches;
FIGS. 4A, 4B, and 4C are block diagrams each showing the configuration of an optical interface unit;
FIG. 12 shows a wavelength path information management table of the optical cross-connect apparatus;
FIG. 13 shows an OSC alarm indication information management table of the optical cross-connect apparatus;
FIG. 17 shows an OSC alarm indication information management table of the optical cross-connect apparatus using the 1×N optical switch.

DETAILED DESCRIPTION OF THE PREFERRED EMBODIMENTS

Figure 1A:
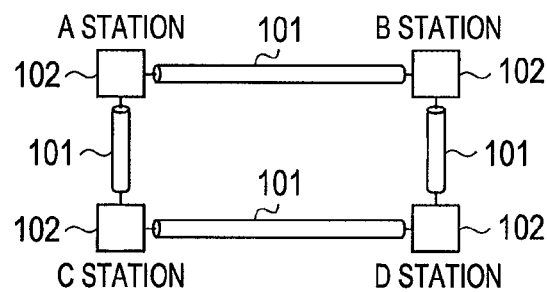
FIG. 1A is a block diagram of a ring optical network.
Figure 1B:
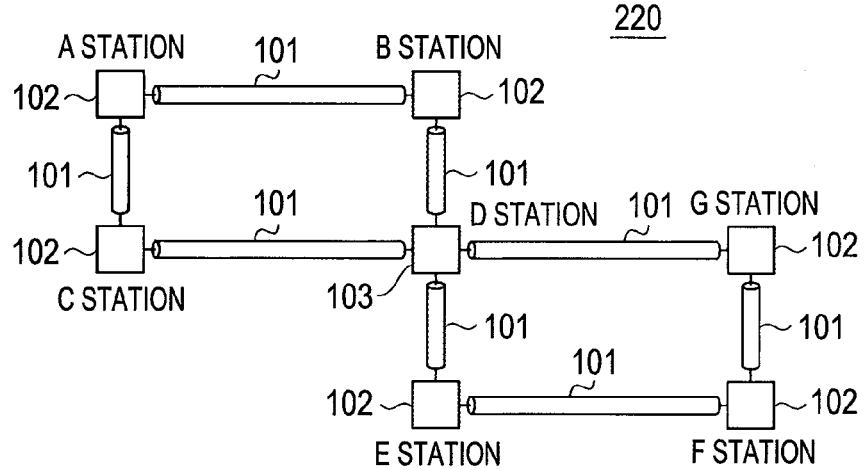
FIG. 1B is a block diagram of a multi-ring optical network.
Figure 1C:
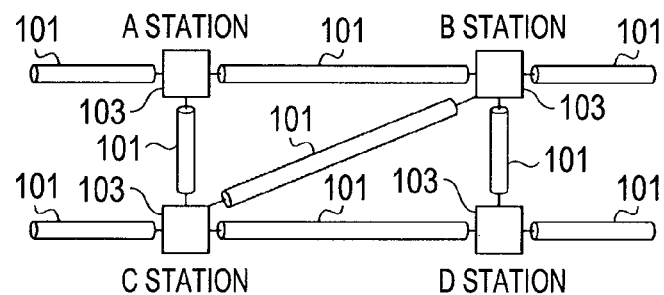
FIG. 1C is a block diagram of a mesh optical network.
Figure 2A:
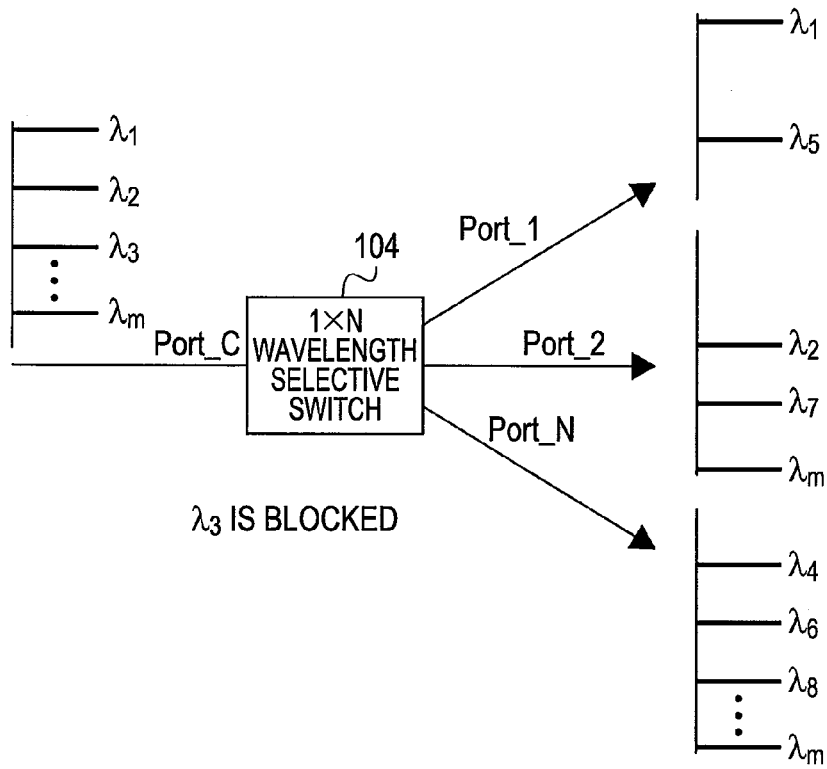
FIG. 2A is a schematic diagram showing the operation of a 1×N WSS optical switch.
Figure 2B:
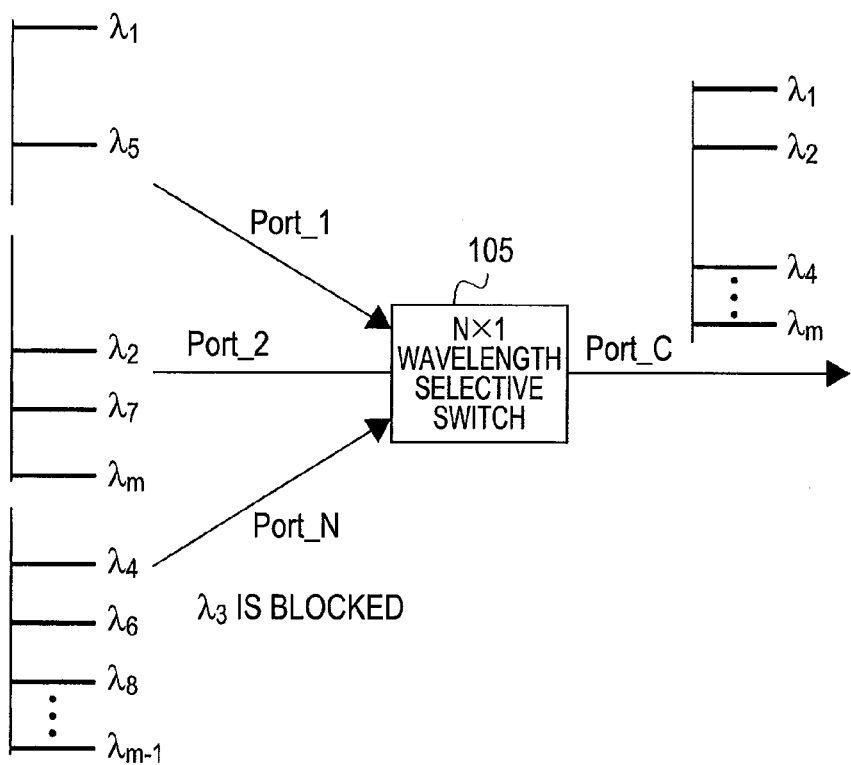
FIG. 2B is a schematic diagram showing the operation of an N×1 WSS optical switch.

The present invention will be disclosed in more detail by examples with reference to the accompanying drawings, in which corresponding components are identified by the same reference numerals and the description will not be repeated.

The configuration of an optical add/drop multiplexer (OADM) using WSS as well as the operation of the optical add/drop multiplexer will be described with reference to FIGS. 3 to 6. First of all, of the functional units constituting the OADM, hardware relating to optical signals will be described with reference to FIG. 3. In FIG. 3, an OADM 102 includes two optical switch units 116 in each node with respect to each direction. The OADM 102 receives an optical signal from an optical fiber transmission line 101. Then, the OADM 102 amplifies the received optical signal by a reception amplifier 108 so as to compensate the loss of the transmission line. Then, the OADM 102 transmits the amplified optical signal to a 1×2 WSS optical switch 110. The 1×2 WSS optical switch 110 controls the optical switch based on the path setting information stored in a control unit not shown. In other words, the WSS control switch is based on the branch information indicating which one of the wavelengths is dropped by a particular node and which one of the wavelengths is allowed to pass through by the particular node. Further, a 2×1 WSS optical switch 111 controls the optical switch based on the insertion information indicating which one of the wavelengths is added by a particular node and which one of the wavelengths is allowed to pass through by the particular node. In FIG. 3, both the optical switch units 116 of directions 1 and 2 use Port_2 as an add/drop port, and Port_1 as a through port. The main signal having passed through the 2×1 WSS optical switch 111 is amplified by a transmission amplifier 109. Then, the signal is transmitted again to the optical fiber transmission line 101.

Only a very small part of the main signal having passed through the 2×1 WSS optical switch 111 is branched by a main signal wavelength optical coupler 106. Then, the light levels per optical wavelengths are monitored by an optical channel monitor 112. When the light level shows an abnormal value out of the expected range, the optical channel monitor 112 detects an alarm for each individual wavelength.

In the input and output of the transmission line 101 for each direction, supervisory optical mux and demux 117 are provided to connect only a supervisory optical signal to an optical supervisory channel (OSC) unit 107. The optical supervisory channel unit 107 communicates information with the adjacent nodes by the supervisory optical signal having a wavelength different from the wavelength of the main signal. The supervisory optical signal transmits alarm indication information or other information from the adjacent node, using an SDH signal such as STM-1 (155.52 Mbits/s) depending on the necessity.

The optical signal to be added or dropped by a particular node is generated and received by an optical interface unit 113 of the particular node. In the case where the optical signal to be input and output through Port_2 of each optical switch has only one wavelength, the optical interface unit 113 can be configured as shown in FIG. 4A. In other words, a transponder unit 114 is directly connected to Port_2.

On the other hand, when the optical signal having plural wavelengths is input and output through Port_2 of each optical switch, the optical interface unit 113 connects the optical signal to the transponder unit 114 through arrayed waveguide grating (AWG) mux and demux 115 as shown in FIG. 4B.

It is also possible that, as shown in FIG. 4C, the optical interface unit 113 connects the optical signal to the transponder unit 114 through the 1×N WSS optical switch 104 and through the N×1 WSS optical switch 105.

Figure 5:
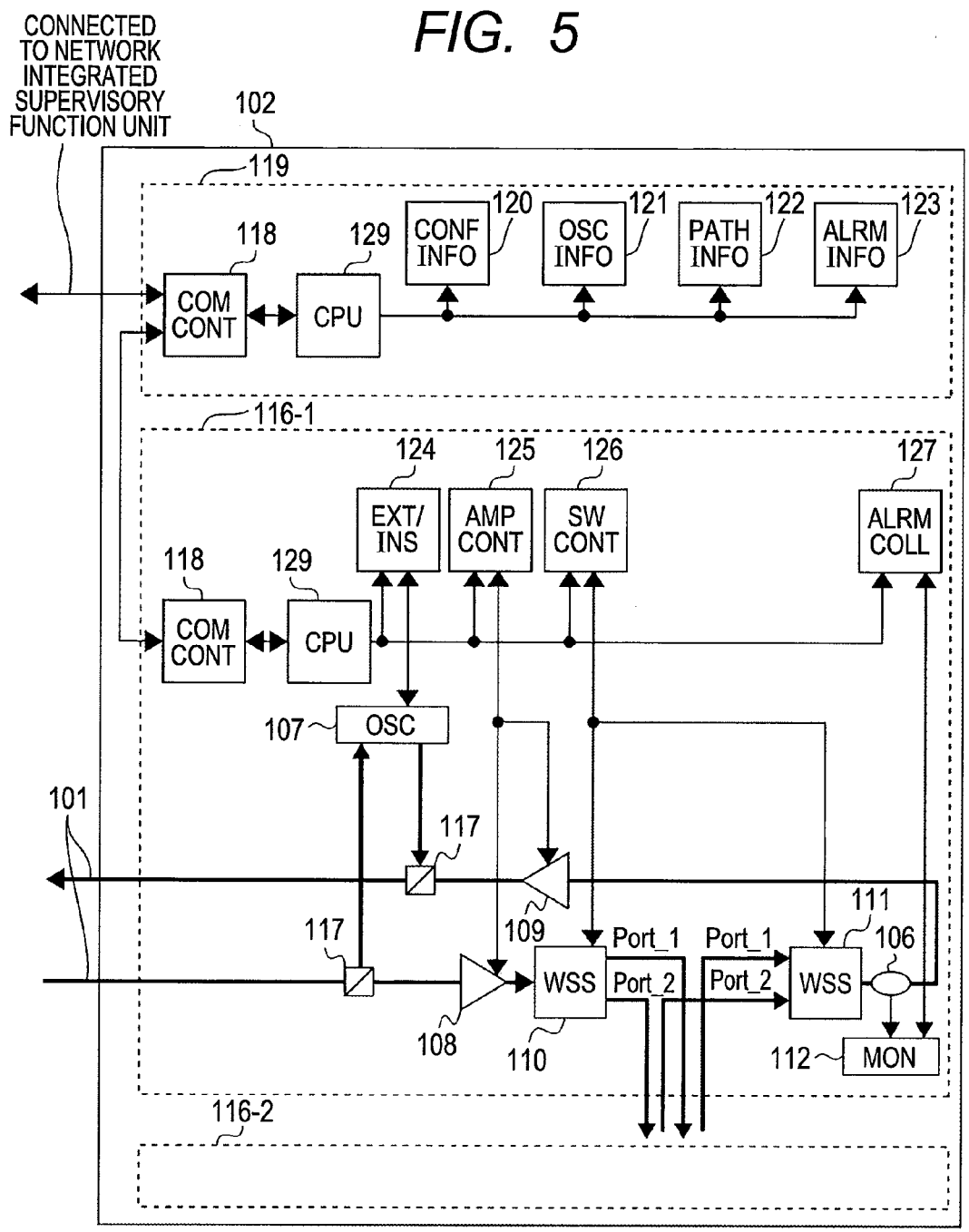
FIG. 5 is a block diagram showing the node configuration including control functional units of the optical add/drop multiplexer.

The configuration of the whole OADM including the supervisory unit will be described with reference to FIG. 5. In FIG. 5, the OADM 102 includes a supervisory unit 119 and two optical switch units 116.

Internal control units of the optical switch unit 116 include an OSC alarm information extraction/insertion unit 124, an optical amplifier control unit 125, an optical switch control unit 126, an alarm information collection unit 127, a CPU 128, and a communication control unit 118.

The OSC alarm information extraction/insertion unit 124 extracts alarm indication information from the OSC unit 107, and inserts the alarm indication information to an OSC optical signal. Then, the OSC optical signal is transmitted to the subsequent nodes. The optical amplifier control unit 125 controls a reception amplifier 108 and a transmission amplifier 109. The optical switch control unit 126 drives the 1×2 WSS optical switch 110 and the 2×1 WSS optical switch 111, based on the wavelength path setting information of the particular node. Then, the optical switch control unit 126 manages the optical switch setting information of the particular direction. The alarm information collection unit 127 collects main signal alarm information for each wavelength, from the light level of each wavelength monitored by the optical channel monitor 112. The internal control units from the OSC alarm information extraction/insertion unit 124 to the alarm information collection unit 127 are connected to the CPU 128 of the optical switch unit 116 by a communication line within the optical switch unit 116.

The node supervisory unit 119 includes a configuration information storage unit 120, an OSC alarm information storage unit 121, a path management information storage unit 122, an alarm information storage unit 123, a CPU 129, and a communication control unit 118.

The configuration information storage unit 120 has a configuration information table containing the configuration of the whole node. In other words, the configuration information table contains the number of directions supported by the optical switch unit 116, the range of wavelengths supported by the interface unit, and the like. The OSC alarm information storage unit 121 has a table for managing the OSC alarm information extracted by the optical switch unit 116 with respect to each direction. The path management information storage unit 122 has a management table of the wavelength state with respect to each direction. The alarm information storage unit 123 manages the alarm information detected by the optical switch unit 116, and the like, with respect to each direction.

The configuration information storage unit 120 to the alarm information storage unit 123 are connected to the CPU 129 of the node supervisory unit 119 by a communication line within the node supervisory unit 119.

The CPU 128 for controlling the optical switch unit 116 and the CPU 129 of the node supervisory unit 119 are connected through the communication control units 118 of the respective functional units. In this way, the node supervisory unit 119 communicates with each of the optical switch units 116. The node supervisory unit 119 consolidates the information from all the optical switch units 116 of the node. The node supervisory unit 119 transmits an optical path setting or other instructions, to each of the optical switch units 116.

Figure 6:
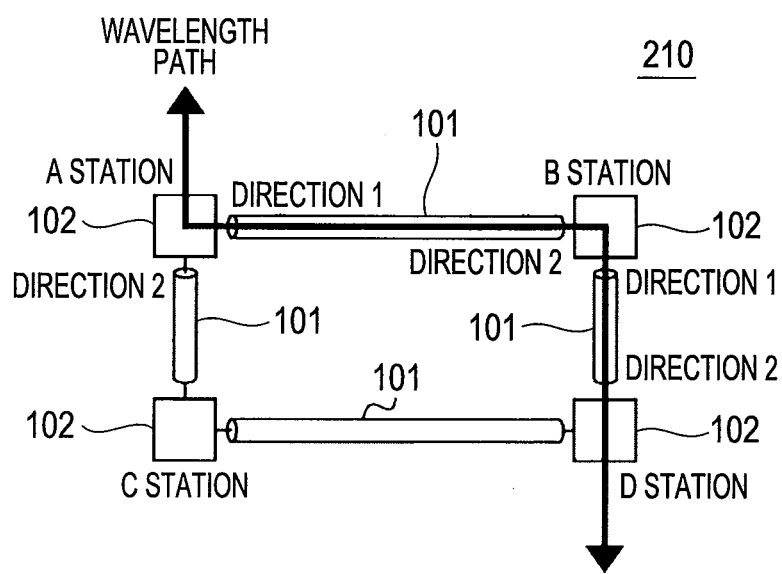
FIG. 6 shows a wavelength path setting of the ring optical network to illustrate LOS alarm masking.

The alarm indication will be described with reference to FIG. 6. In FIG. 6, an alarm occurs in a ring network formed by optical add/drop multiplexers, in which a wavelength path is set (wavelength: $\lambda 1$) to add and drop an optical signal in A and D stations while allowing the optical signal to pass through B station.

In FIG. 6, an abnormality occurs in the connection between the output side of the transponder unit 114 of A station and the optical switch unit 116 of A station on the direction 1 side. In this case, the optical channel monitor 112 of A station on the direction 1 side detects an abnormality of $\lambda 1$ signal. The optical switch unit 116 detects a loss of signal (LOS) alarm of the $\lambda 1$ wavelength signal, and notifies the node supervisory unit 119. Here, if there is no alarm mask function, also in B station through which the main signal passes, the LOS alarm of the $\lambda 1$ wavelength signal is detected by the optical channel monitor 112 of the optical switch unit 116 of B station on the direction 1 side. Further, in the drop node, the LOS alarm of the optical signal is also detected in the input of the transponder unit 114 of the optical interface unit 113. As a result, the same LOS alarm of $\lambda 1$ is detected by plural the respective nodes. This makes it difficult for an administrator to identify the location where the alarm actually occurred.

In order to prevent the same alarm from occurring in plural the respective nodes, a forward error indication (FDI) alarm is generated to indicate the occurrence of the factor alarm on the upstream side of the optical signal. Then, the alarm is transferred to the downstream nodes. The principle of the above alarm indication mechanism is as follows:

(1) When an LOS alarm of $\lambda 1$ is detected in A station, an FDI alarm of the wavelength $\lambda 1$ of the optical signal is generated in the alarm management information storage unit 123 of the node supervisory unit 119 of A station.

(2) The FDI alarm information generated in A station is stored in the OSC alarm information storage unit 121 of the node supervisory unit 119. Then, the node supervisory unit 119 issues an instruction to the OSC alarm information extraction/insertion unit 124 of the optical switch unit 116 on the direction 1 side, to insert the FDI alarm information generated in A station into an SDH signal of the OSC. Then, the FDI alarm is transmitted to the next node (B station).

(3) In B station, the OSC alarm information extraction/insertion unit 124 of the optical switch unit 116 on the direction 2 side receives the FDI alarm of $\lambda 1$ transmitted from A station. The node supervisory unit 119 of B station stores the FDI alarm of $\lambda 1$ received by the optical switch unit 116 on the direction 2 side, into the OSC alarm information storage unit 120.

(4) The node supervisory unit 119 of B station refers to the wavelength path management information storage unit 122, and confirms that the $\lambda 1$ path information is THROUGH with respect to the direction 2 from which the FDI alarm was received. Then, the node supervisory unit 119 issues an instruction to the optical switch unit 116 of the other direction (direction 1) from which the FDI alarm information was not received, to insert the FDI alarm of $\lambda 1$ into the OSC signal. Then, the FDI alarm is transmitted to the next C node. In this way, the transfer of the FDI alarm to the subsequent nodes is realized.

(5) Further, the node supervisory unit 119 of B station refers to the path management information storage unit 122, and confirms that the $\lambda 1$ path information is THROUGH with respect to the direction 2 from which the FDI alarm was received. Then, the node supervisory unit 119 of B station masks the LOS alarm of $\lambda 1$, which is detected by the optical switch unit 116 of the other direction (direction 1) from which the FDI alarm information was not received. In other words, the alarm information collection unit 127 of the optical switch unit 116 detects the LOS alarm of $\lambda 1$. On the other hand, the alarm information storage unit 123 of the node supervisory unit 119 determines that the LOS alarm of $\lambda 1$ does not occur, and stores the alarm information of $\lambda 1$ in the alarm information storage unit 123. This allows the node supervisory unit 119 of D station to recognize that the LOS alarm of λ1 does not occur. Then, the node supervisory unit 119 of D station masks the alarm spread by the LOS alarm occurred on the upstream side.

(6) In D station, the OSC alarm information extraction/insertion unit 124 of the switch unit 116 on the direction 2 side receives the FDI alarm of λ1 transmitted from B station. The node supervisory unit 119 of D station stores the FDI alarm of λ1 received by the optical switch unit 116 on the direction 2 side into the OSC alarm information storage unit 120.

(7) The node supervisory unit 119 of D station refers to the path management information storage unit 122, and confirms that the λ1 path information is DROP with respect to the direction 2 from which the FDI alarm was received. Then, the node supervisory unit 119 of D station masks the LOS alarm of the transponder unit 114 connected to the direction from which the FDI alarm information was received. In other words, the transponder unit 114 detects the LOS alarm, while the alarm information storage unit 123 of the node supervisory unit 119 determines that the LOS alarm of the transponder unit 114 does not occur and stores the alarm information in the alarm information storage unit 123.

Thus far, the alarm indication operation has been described with respect to the optical add/drop multiplexer supporting two directions in each node. The following describes an optical cross-connect apparatus supporting three or more directions, to which the above described alarm indication may not be applied.

First Embodiment

Figure 7A:
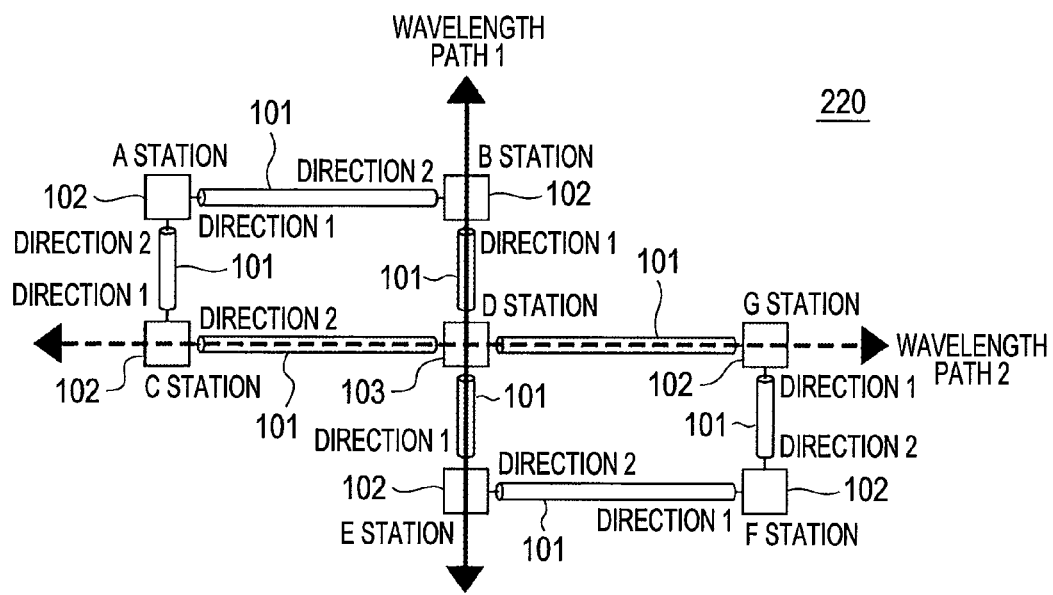
FIGS. 7A and 7B show a wavelength path setting of the multi-ring optical network to illustrate LOS alarm masking.
Figure 7B:
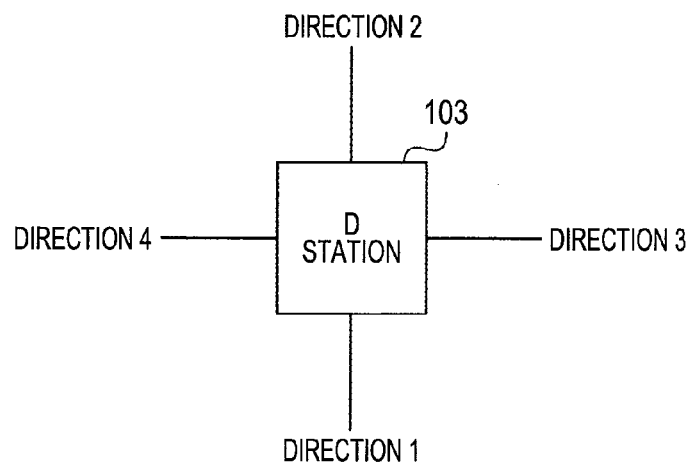

The wavelength path setting of a multi-ring optical network will be described with reference to FIGS. 7A and 7B illustrating how LOS alarm is masked. In a multi-ring optical network 220 of FIG. 7A, D station is an optical cross-connect apparatus 103 supporting four directions. In the multi-ring optical network 220, a wavelength path 1 (wavelength of λ1) is set so that optical signals are added or dropped in B and E stations and that the optical signals are allowed to pass through D station. Further, a wavelength path 2 (wavelength of λ1) is set so that optical signals are added or dropped in C and E stations and that the optical signals are allowed to pass through D station. In FIG. 7B, the directions of D station are defined.

Returning to FIG. 7A, the consideration will next be given to alarm indication when an alarm occurs in the wavelength path 1. Similarly to the case of the optical add/drop multiplexer described with reference to FIG. 6, it is assumed that an abnormality occurs in the connection between the output side of the transponder unit 114 of B station and the optical switch unit 116 of B station on the direction 1 side. It is naturally found that a problem arises in the FDI alarm indication operation in the optical cross-connect apparatus of D station. There are only two directions in the optical add/drop multiplexer. Thus, the optical add/drop multiplexer receives the FDI alarm in the direction from which the FDI alarm was not received, namely, the direction 1. Then, if necessary, the optical add/drop multiplexer transfers the FDI alarm to the direction 2, without taking into account the direction in which the FDI alarm should be transferred.

In the case of the wavelength paths shown in FIGS. 7A and 7B, the FDI alarm received in the direction 2 has to be transferred to the direction 1 and should not be transferred to the directions 3 and 4. When the FDI alarm is transferred to the direction 3 or 4 by mistake, a wrong alarm is transferred with respect to the wavelength path 2. Consequently, the wrong LOS alarm is masked with respect to the wavelength path 2.

Further, the LOS alarm mask is the same as the case of the FDI alarm indication. In other words, the optical add/drop multiplexer simply masks the LOS alarm of the direction 2 based on the FDI alarm received in the direction 1. In the example of FIGS. 7A and 7B, however, it is necessary to manage the direction of the LOS alarm to be masked in the optical cross-connect apparatus.

Figure 8:
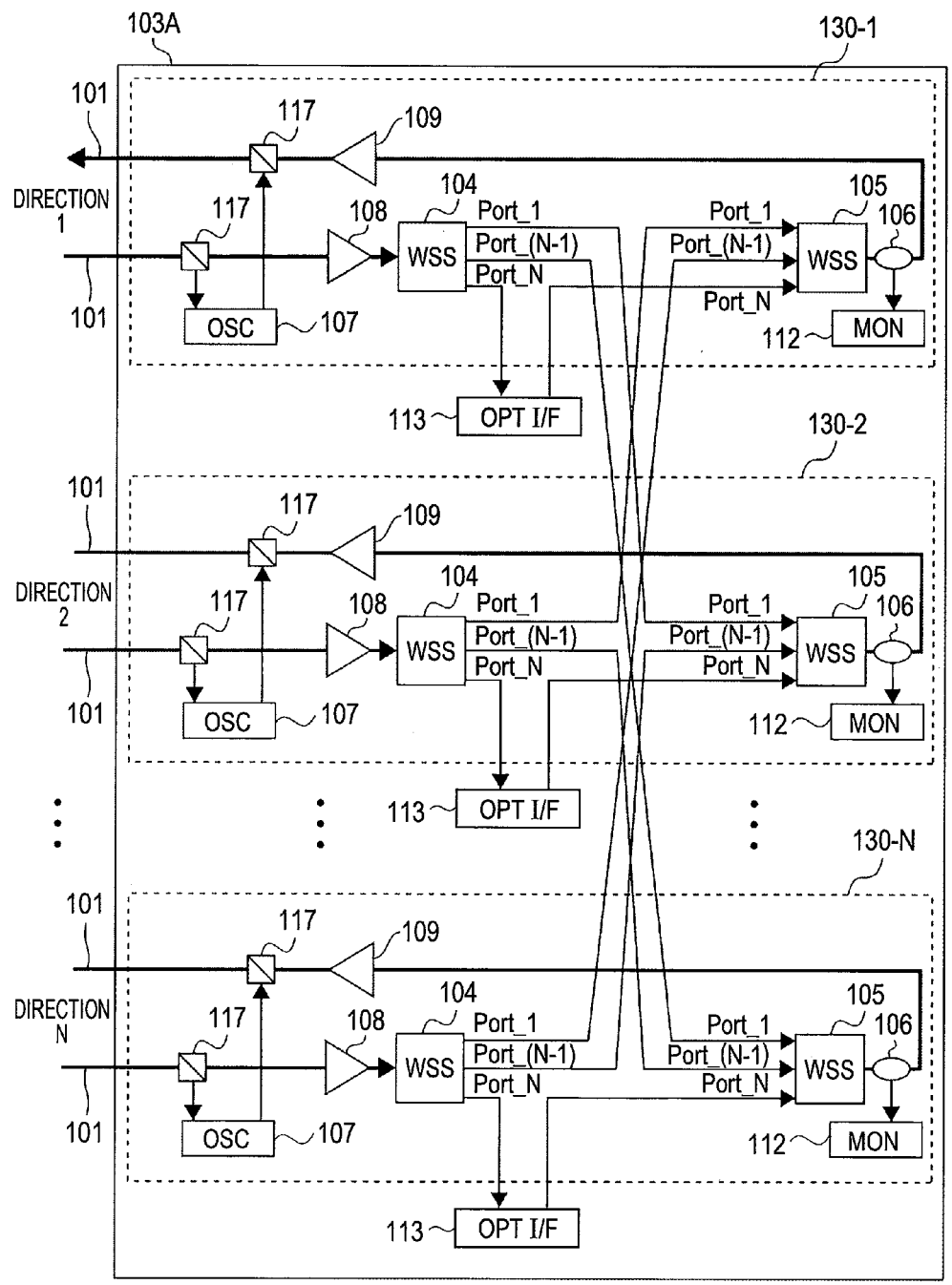
FIG. 8 is a hardware block diagram showing a main signal in an optical cross-connect apparatus.

The configuration of the optical cross-connect apparatus supporting N directions using WSS will be described with reference to FIG. 8. FIG. 8 is a functional block diagram of hardware relating to optical signals, of the functional units constituting an optical cross-connect apparatus 103A. It shows the configuration in which N optical switch units 130 are provided for each node with respect to each direction.

In FIG. 8, the optical switch unit 130 of the optical cross-connect apparatus 103A is different from the optical switch unit 118 of the optical add/drop multiplexer 102 in the following way. In the optical cross-connect apparatus 103A, the optical switch unit 130 includes optical switches, 1×N WSS optical switch 104 and N×1 WSS optical switch 105, to support N directions. The input and output ports Port_1, Port_2, .... Port_N of each of the respective optical switch units 130 are connected to each other by optical fibers. Except for this point, the functional block of the optical switch unit 130 in FIG. 8 is the same as the optical add/drop multiplexer 102.

In other words, the optical cross-connect apparatus 103A includes N optical switch units 130 and N optical interface units 113. The optical switch unit 130 includes the optical mux 117, reception amplifier 108, 1×N WSS 104, N×1 WSS 105, optical coupler 106, transmission amplifier 108, optical demux 117, optical supervisory channel unit 107, and optical channel monitor 112. The optical interface unit 113 is provided between the output Port_N of the 1×N WSS 104 and the input Port_N of the N×1 WSS 105.

Figure 9:
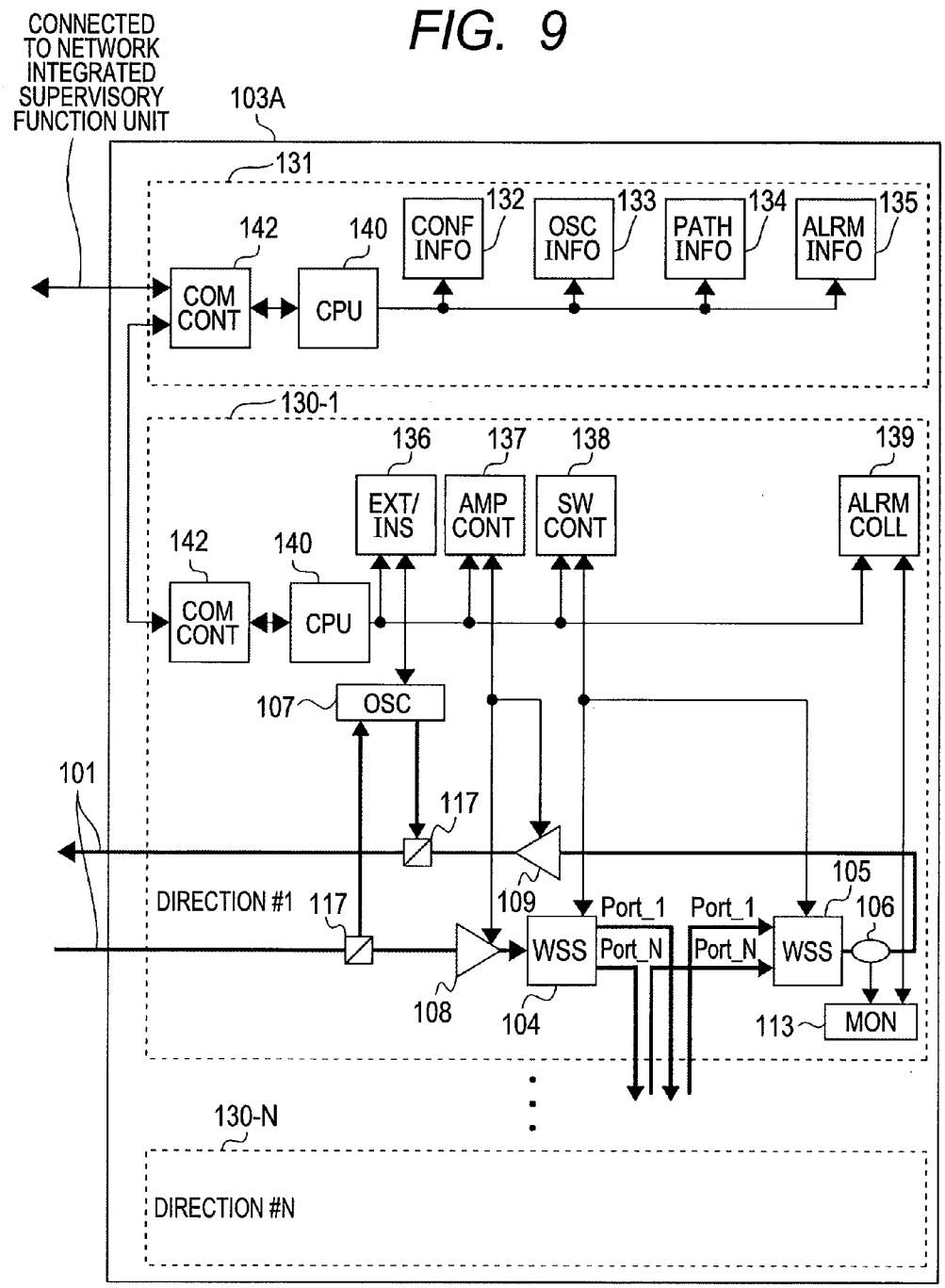
FIG. 9 is a block diagram of the configuration including a control unit of an optical cross-connect apparatus supporting N directions.

The configuration of the whole optical cross-connect apparatus including the supervisory unit will be described with reference to FIG. 9. In FIG. 9, the control units of the optical switch unit 130 of the optical cross-connect apparatus 103A include an OSC alarm information extraction unit 136, an optical amplifier control unit 137, an optical switch control unit 138, and an alarm information collection unit 139. This configuration is the same as in the optical add/drop multiplexer 102. Also, the optical cross-connect apparatus 103A is the same as the optical add/drop multiplexer 102 in that the control units from the OSC alarm information extraction unit 136 to the alarm information collection unit 139 are connected to a CPU 140 of the optical switch unit 130 by a communication line within the optical switch unit 130.

The configuration of a node supervisory unit 131 of the optical cross-connect apparatus 103A is the same as the configuration of the optical add/drop multiplexer 102. In other words, the node supervisory unit 131 includes a configuration information storage unit 132, an OSC alarm indication information storage unit 133, a path management information storage unit 134, and an alarm information storage unit 135. Further, the information storage units from the configuration information storage unit 132 to the alarm information storage unit 135 are connected to a CPU 141 of the node supervisory unit 131 by a communication line within the node supervisory unit 131.

As described above, the optical cross-connect apparatus 103 is substantially the same as the optical add/drop multiplexer 102 with respect to the node configuration itself. However, the optical cross-connect apparatus 103 is significantly different in the management information itself to be stored in each information storage unit to realize alarm indication.

The following describes what information is managed and what operation is performed in the alarm indication in D station of FIGS. 7A and 7B, which is the optical cross-connect apparatus supporting four directions.

Figure 10:
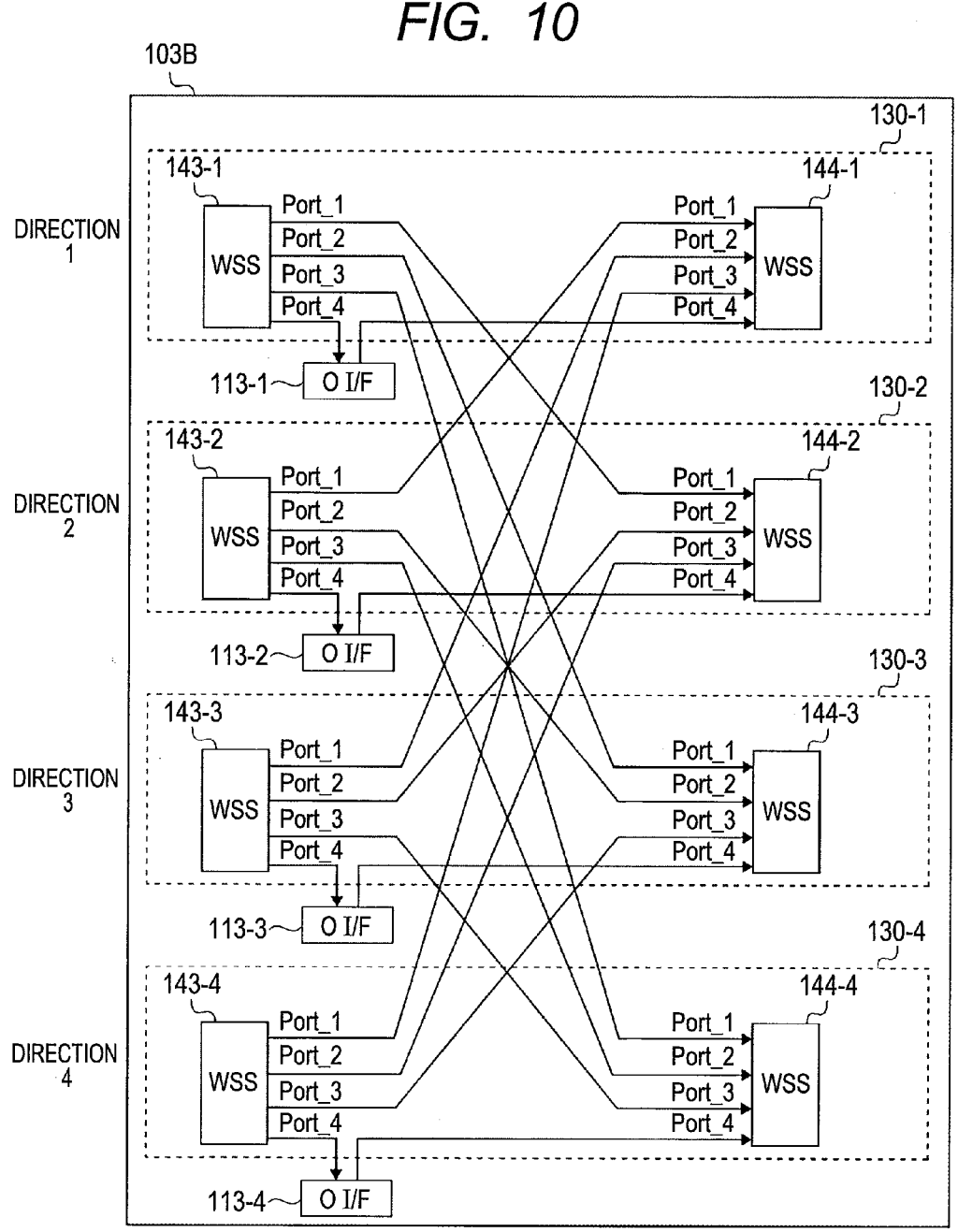
FIG. 10 is a block diagram showing the connection configuration between ports of an optical cross-connect apparatus.

The relationship between the number of directions connected to the optical cross-connect apparatus and the number of ports of WSS used for the optical cross-connect apparatus will be described with reference to FIG. 10. In FIG. 10, an optical cross-connect apparatus 103B supports four directions, and thus includes four optical switch units 130. The output of WSS 143 of the optical switch unit 130 has four ports in total, of which three are connected to the other directions and one for DROP. Also, the input of WSS 144 of the optical switch unit 130 has four ports in total, of which three are connected from the other directions and one is for ADD. In other words, the number of directions that can be connected to the optical cross-connect apparatus 103 is equal to the number of output ports of the WSS 143 for DROP with respect to each direction, and equal to the number of input ports of the WSS 144 for ADD with respect to each direction.

Figure 11:
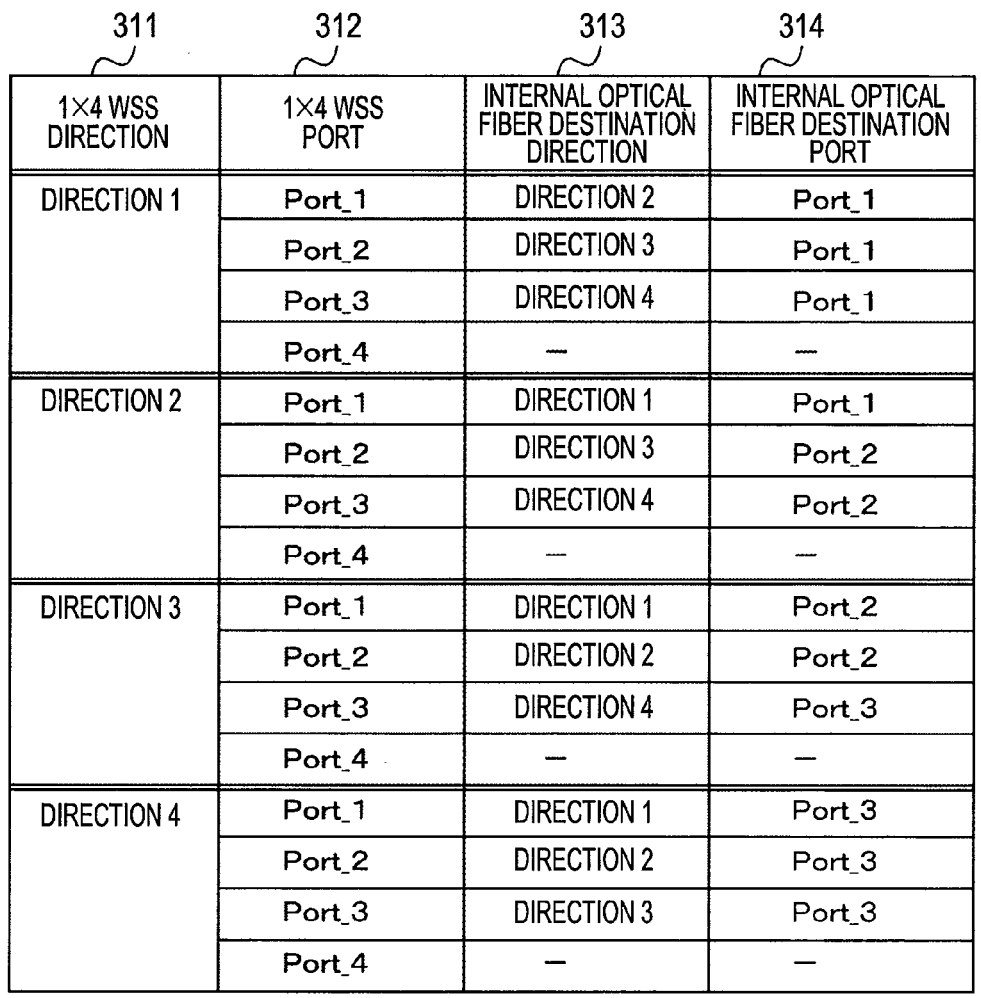
FIG. 11 shows a fiber connection information management table of the optical cross-connect apparatus.

Referring to FIG. 11, a description will be given of a configuration management table stored in a configuration management information storage unit of the node supervisory unit. In FIG. 11, a configuration management table 310 includes a 1×4 WSS direction 311, a 1×4 WSS Port 312, an internal optical fiber destination direction 313, and an internal optical fiber destination port 314. The configuration management table 310 of FIG. 11 illustrates the relationship shown in FIG. 10.

In FIG. 11, the configuration management table 310 manages which port outputs are connected to which 4×1 port inputs for each direction with respect to each of the 1×4 WSS optical switches. More specifically, the Port_1 output of the 1×4 WSS optical switch 143 of the direction 1 is connected to the Port_1 input of the 4×1 WSS optical switch 144 of the direction 2. Further, the Port_2 output of the 1×4 WSS optical switch 143 of the direction 1 is connected to the Port_1 input of the 4×1 WSS optical switch 144 of the direction 3, and so on. In this way, the connection relationship between each 1×4 WSS optical switch and each 4×1 WSS optical switch of the optical cross-connect apparatus 103 is specified and managed in the configuration management table 310.

Referring to FIG. 12, a description will be given of a wavelength path management table stored in a wavelength path management information storage unit of the node supervisory unit. In FIG. 12, a wavelength path management table 320 includes a 1×4 WSS direction 321, a port 322, a wavelength 323, a 1×4 WSS path setting 324, a 4×1 WSS path setting 325, and a transponder destination location 326.

The wavelength path management table 320 manages the optical switch states of the 1×4 WSS optical switch 143 and the 4×1 WSS optical switch 144, for each port and for each wavelength with respect to each direction. More specifically, the wavelength path management table 320 manages the state of each optical switch supporting from λ1, λ2, λ3, . . . λm for each port, with respect to the direction 1.

The path state of the 1×4 WSS optical switch 143 can only be set to THROUGH or DROP, or to nothing depending on the node to be used. Thus, the path state of the 1×4 WSS optical switch 143 is managed with the following three states: "THROUGH", "DROP", and "OFF". Here, "OFF" shows the state in which nothing is set in the path setting. Only one of the ports from Port_1 to Port_4 can be set to "THROUGH" or "DROP" with respect to each direction. In FIG. 12, the path setting of λ1 for Port_1 is "THROUGH". Consequently, the path setting of λ1 for the other Port_2, 3, and 4 is "OFF".

The path state of the 4×1 WSS optical switch 144 is only set to THROUGH, ADD, or to nothing, depending on the node to be used. Thus, the path state of the 4×1 WSS optical switch 143 is managed with the following three states: "THROUGH", "Add", and "OFF". Here, "OFF" shows the state in which nothing is set in the direction setting. Only one of the ports from Port_1 to Port_4 can be set to "THROUGH" or "Add" with respect to each direction. In FIG. 12, the path setting of λ1 for Port_1 is "THROUGH". Consequently, the path setting of λ1 for the other Port_2, 3, and 4 is "OFF".

In the last row of the wavelength path management table 320, the transponder destination location is managed, when there is a wavelength path to be added or dropped by a particular node, to identify which wavelength of which port is one-to-one connected to the transponder. Although not shown in the figure, it is assumed that a wavelength path of Add or DROP is set to λ3 of Port 4 of the direction 1 in the node, and that the transponder is inserted into the third slot of plural slots in the first unit of plural units. In such a case, the data of "1-3" (=the unit number–the slot number) is stored in the transponder location field corresponding to the line of "Direction 1", "Port_4", and "λ3". In this way, the connection relationship between the transponder location and the optical switch is managed in the wavelength path management table 320.

Referring to FIG. 13, a description will be given of an OSC alarm information management table stored in an OSC alarm indication information storage unit of the node supervisory unit. In FIG. 13, an OSC alarm information management table 330 includes a 1×4 WSS direction 331, a port 332, a wavelength 333, a 1×4 WSS optical switch path setting 334, an internal optical fiber destination direction 335, a transponder destination location 336, and an FDI reception 337.

In the OSC alarm indication information storage unit 133, the OSC alarm information management table 330 is generated by extracting information necessary for alarm indication, from the management tables stored in the configuration management information storage unit 132 and stored in the wavelength path management information storage unit 134, respectively, as described in FIGS. 11 and 12. The OSC alarm information management table 330 manages the state of the optical switch for each port and each wavelength in the 1×4 WSS optical switch 143 with respect to each direction, by extracting necessary information from the wavelength path management information storage unit. Then, the OSC alarm information management table 330 extracts the internal optical fiber destination direction information that indicates which 1×4 WSS output port is connected to which direction from the configuration management information storage unit. Then, the OSC alarm information management table 330 manages the extracted internal optical fiber destination direction information.

In FIG. 13, the information from the 1×4 WSS direction 331 of the first row to the 1×4 WSS optical switch path setting 335 of the fourth row is the same as the information of the wavelength path setting management table 320 described in FIG. 12. Further, the transponder destination location 336 of the sixth row is the same as the content of the sixth row of the wavelength path setting management table 320.

However, the information of the internal optical fiber destination direction 335 of the fifth row is stored by referring to the content of the internal optical fiber destination direction 313 of the configuration management table 310 which has been described in FIG. 11. In other words, in FIG. 11, Port_1 of the optical switch unit of the direction 1 is connected to the direction 2, Port_2 is connected to the direction 3, and Port_3 is connected to the direction 4. Thus, in FIG. 13, the fifth row of the OSC alarm information management table 330 is also managed with "direction 2" for the field corresponding to Port_1, "direction 3" for the field corresponding to Port_2, and "direction 4" for the field corresponding to Port_3. The FDI reception 337 of the seventh row, which is the last row of the OSC alarm information management table 330 in FIG. 13, stores the FDI alarm information received by the optical switch unit. FIG. 13 shows that the FDI alarm is received in the wavelength path λ1 of the direction 1.

Next, referring to FIG. 14, a description will be given of the operation of transferring the FDI alarm based on the OSC alarm information management table 330. Here, the description will focus on a process flow in the event that an abnormality occurs in the optical fiber connection between the transponder and the optical switch unit in B station with respect to the wavelength path λ1 of FIG. 7, and that an FDI alarm of λ1 is transmitted from B station to D station.

Figure 14:
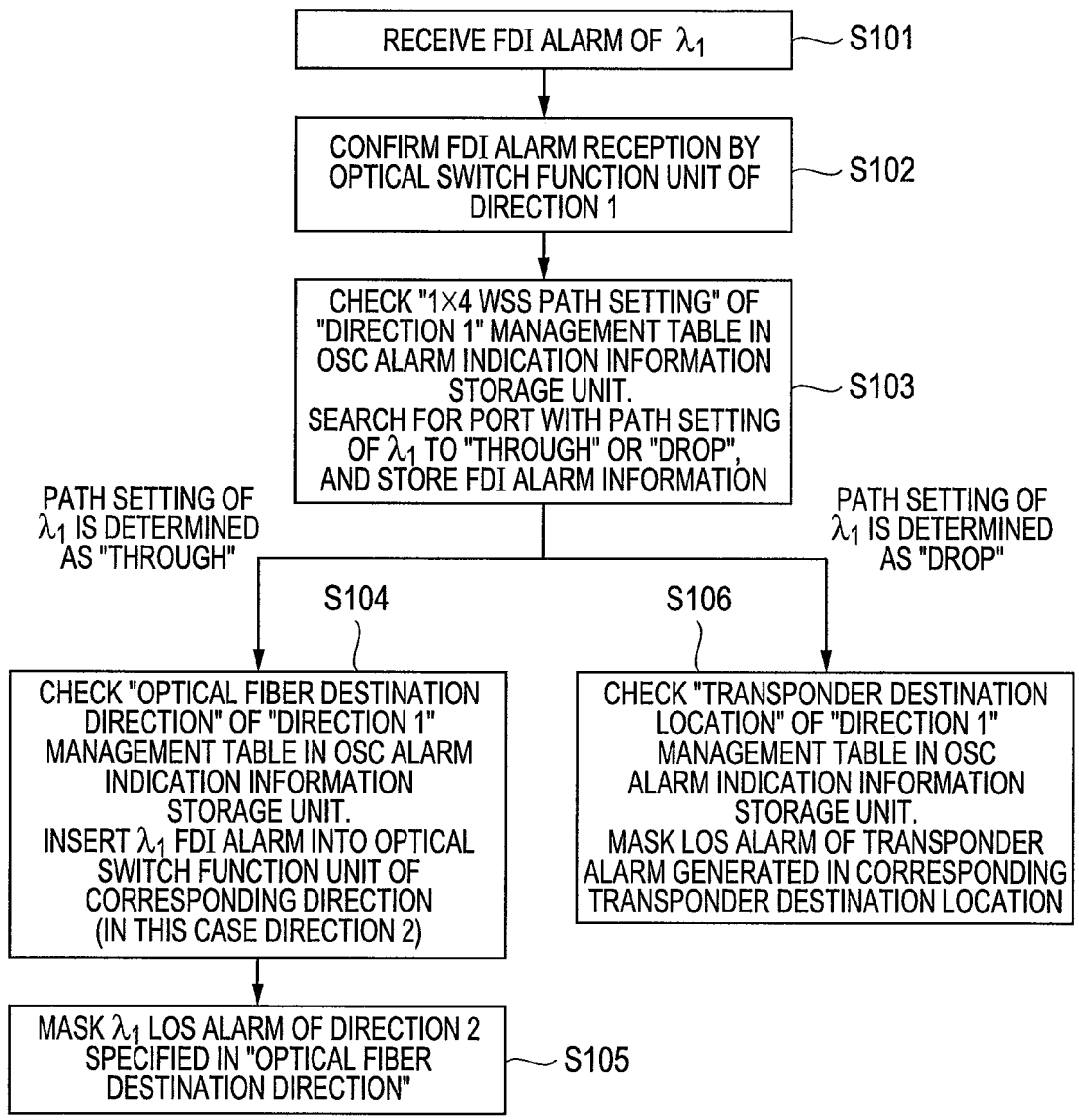
FIG. 14 is a flowchart of an alarm indication process of the optical cross-connect apparatus.

In FIG. 14, the direction-1 optical switch unit 130 of D station receives an FDI alarm of λ1 (S101). The node supervisory unit 131 of D station confirms that the direction-1 optical switch unit 130 received the FDI alarm of the λ1 wavelength path (S102). Based on the OSC alarm information management table 330 for "Direction 1" in the OSC alarm indication information storage unit, the node supervisory unit 131 of D station searches the OSC alarm information management table 330 for the port with the path setting of "THROUGH" or "DROP" in the 1×4 WSS optical path setting 334 of λ1. Then, the node supervisory unit 131 of D station stores the information on the reception of the FDI alarm, to the field of the FDI reception 337 of the corresponding line (S103).

The node supervisory unit 131 of D station branches the process flow into two processes, depending on whether the 1×4 WSS optical path setting 334 is set to "THROUGH" or "DROP".

When the 1×4 WSS optical path setting 334 is "THROUGH", the node supervisory unit 131 of D station checks the field of the internal optical fiber destination direction 335 corresponding to the line of the stored FDI alarm, based on the OSC alarm information management table 330 for "Direction 1" in the OSC alarm indication information storage unit. Then, the node supervisory unit 131 of D station transmits the FDI alarm to the corresponding stored direction (S104). Here, the information of "Direction 2" is stored in the corresponding line of FIG. 13. Thus, the FDI alarm of λ1 is inserted into the optical switch unit of the direction 2. The node supervisory unit 131 of D station masks the λ1 LOS alarm of the direction 2 (S105).

When the 1×4 WSS optical path setting 334 is "DROP", the node supervisory unit 131 of D station checks the field of the transponder destination location 336 corresponding to the line of the stored FDI alarm, based on the OSC alarm information management table 330 for "Direction 1" in the OSC alarm indication information storage unit 133. Then, the node supervisory unit 131 of D station masks the LOS alarm generated in the transponder stored in the corresponding transponder destination location (S106).

By performing the above processes, it is possible even for the optical cross-connect apparatus supporting three or more directions to effectively perform the alarm indication process of the FDI alarm or other alarms, and to mask the LOS alarm spread other than the factor alarm.

Further, by configuring the management table for each direction as shown in FIGS. 11 to 13, it is possible to add management tables for individual directions increased within the allowable range of the 1×N WSS optical switch, without having effect on the data of existing management tables. More specifically, the optical cross-connect apparatus of D station described above can only support up to four directions. However, when the WSS of D station is replaced with a 1×9 WSS optical switch from the 1×4 WSS optical switch, it is possible to support up to nine directions. Even in this case, the number of directions can be increased by configuring the management table for each direction as shown in FIG. 13, without having effect on the management tables of the existing directions.

Second Embodiment

In the first embodiment, the description has focused on the alarm indication when the wavelength path is one-to-one (from B station to E station in FIG. 7). A second embodiment relates to the configuration that allows optical multicast path such as a one-to-N wavelength path.

Figure 15:
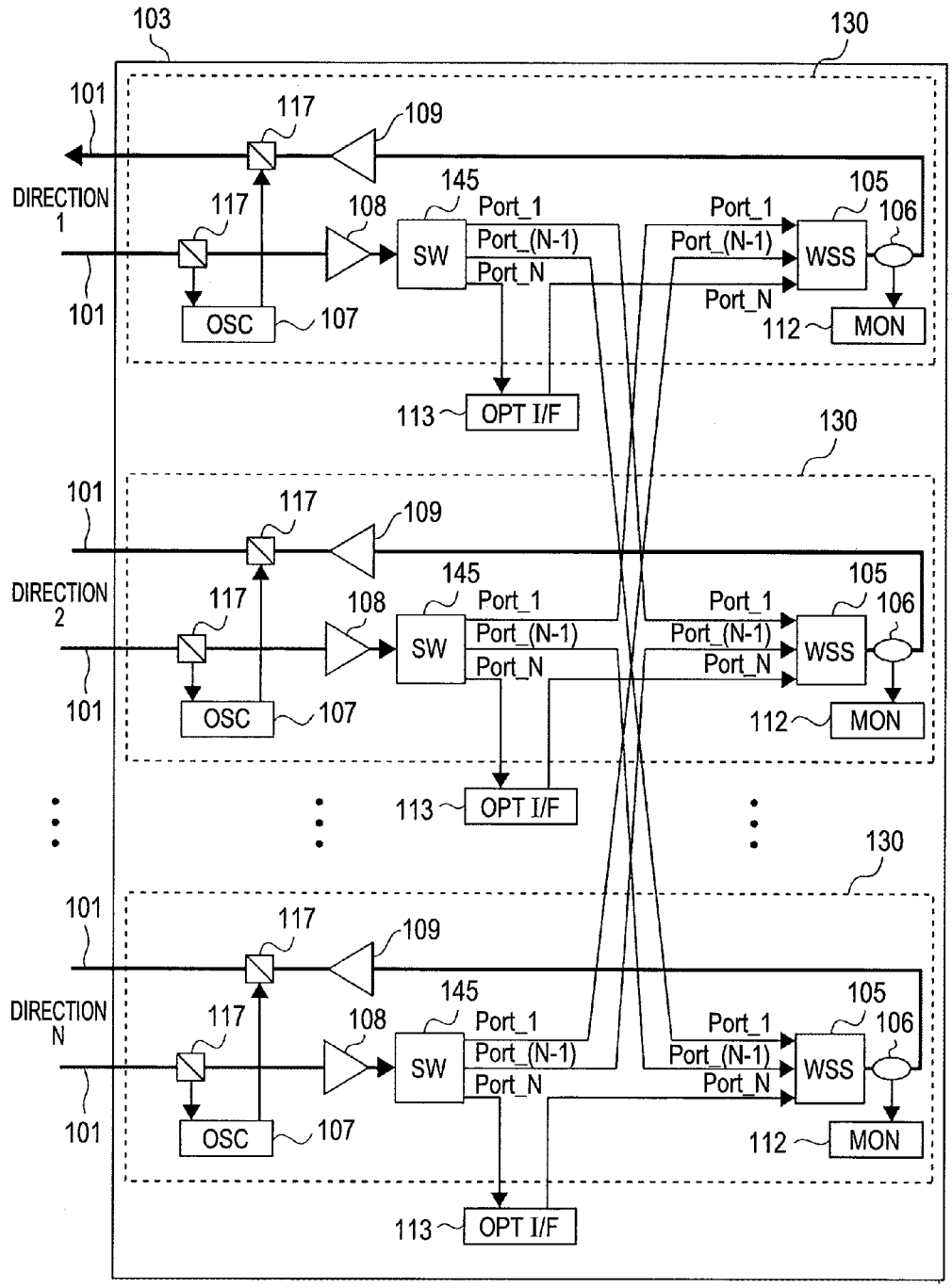
FIG. 15 is a hardware block diagram relating to a main signal in an optical cross-connect apparatus using 1×N optical switches.
Figure 16:
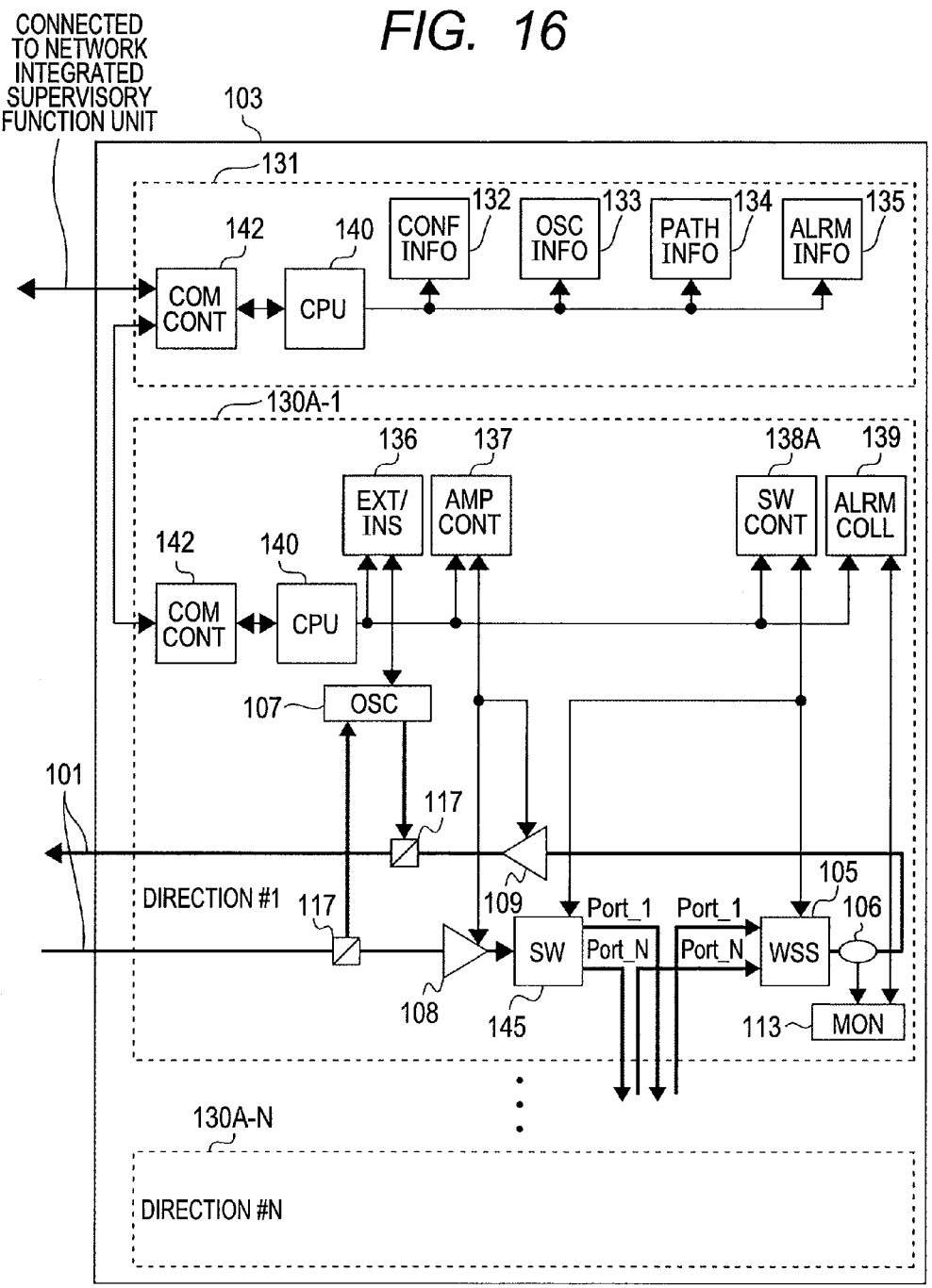
FIG. 16 is a block diagram of the configuration including a control unit of the optical cross-connect apparatus using 1×N optical switches.

The configuration of the optical cross-connect apparatus according to the second embodiment will be described with reference to FIGS. 15 and 16. FIG. 15 is a functional block diagram of a portion relating to optical signals in the optical cross-connect apparatus according to the second embodiment. FIG. 16 is a block diagram of a node. FIGS. 15 and 16 are different from FIGS. 8 and 9 of the first embodiment only in that the 1×N WSS optical switch is replaced with a 1×N WSS optical switch 145 on the DROP/THROUGH selection side in order to achieve multicast.

When the optical switch is used on the DROP/THROUGH selection side, the wavelength multiplexed light is transmitted both on the DROP side and the THROUGH side. For this reason, the configuration of the interface unit 113 may not be realized by the interface unit 113A of FIG. 4A. Consequently, as shown in FIG. 4B or 4C, the interface unit 113 is configured to be connected to the transponder unit 114 through the AWG mux and demux 115 or through the 1×N WSS optical switch 104.

Also in this case, the configuration of the management table itself can be the same as the configuration shown in the first embodiment. However, the second embodiment is different from the first embodiment in the management information. In other words, the path information of the 1×N WSS optical path setting should be managed with four states, by adding "BRIDGE", which is the path setting state indicating multicast path, in addition to the three states of "THROUGH", "DROP", and "OFF".

Referring to FIG. 17, a description will be given of an OSC alarm indication management table, assuming that the wavelength path λ1 of FIG. 7 is a multicast path that drops signal on the interface unit while transmitting the same signal to E station. In FIG. 17, the configuration of the OSC alarm indication management table 330A is the same as the configuration of the OSC alarm indication management table 330 of FIG. 13.

In FIG. 17, the path information data of "BRIDGE", which indicates that there is also DROP signal, is stored in the Direction 1/Port_1/λ1 field of a 1×4 WSS optical switch path setting 334A, instead of "THROUGH" as described in the Direction 1/Port_1/λ1 field of the 1×4 WSS path setting 334 in FIG. 13. Further, in FIG. 17, the location information of the transponder that will actually receive the signal of λ1 in D station is stored in the corresponding field of the transponder destination location 336.

Figure 18:
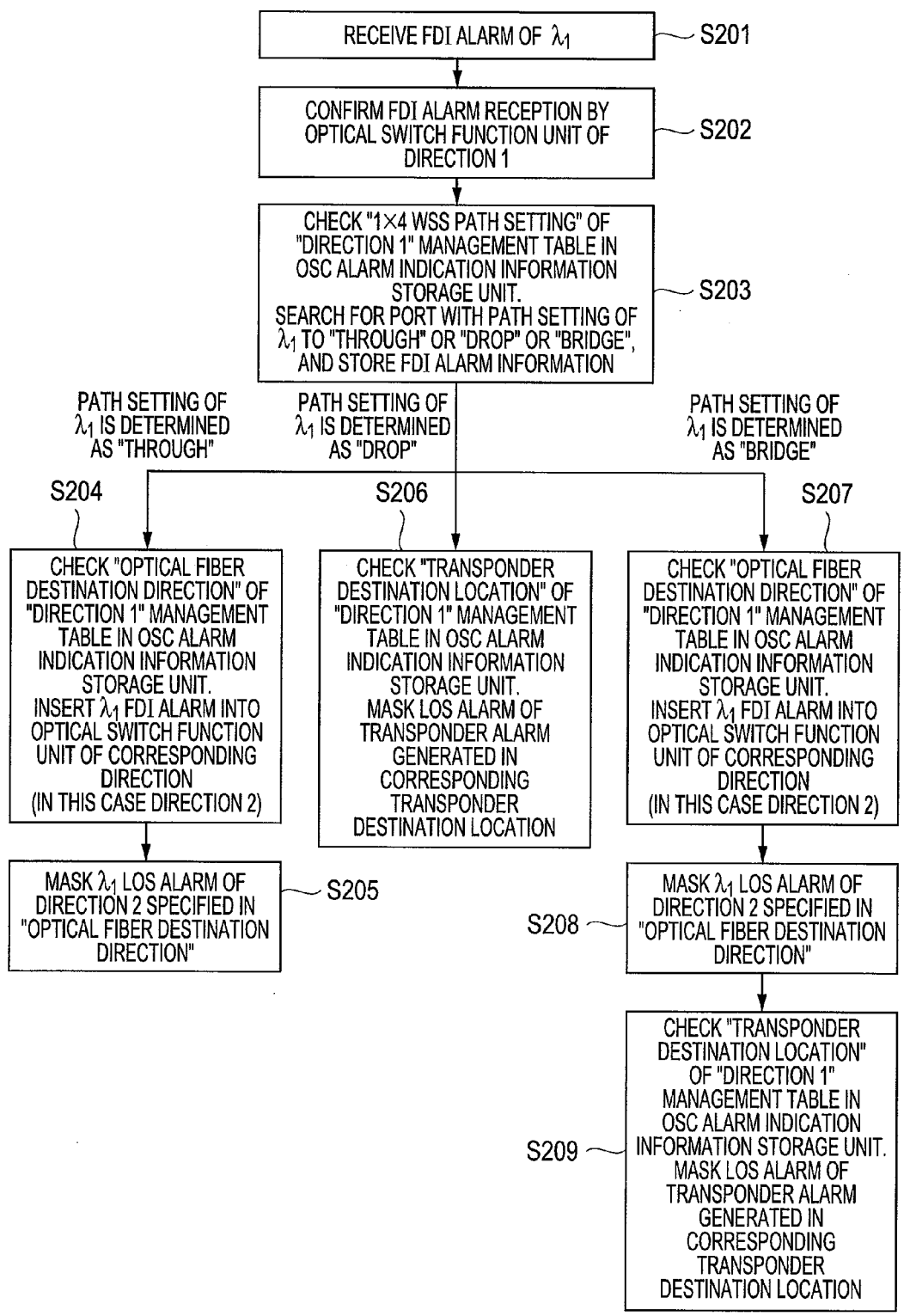
FIG. 18 is a flowchart of an alarm indication process of the optical cross-connect apparatus using the 1×N optical switch.

Referring to FIG. 18, a description will be given of the alarm indication process in the optical cross-connect apparatus including the management table shown in FIG. 17. In FIG. 18, steps 201 to 206 are the same as steps 101 to 106 of FIG. 14, and the description thereof is omitted here. The difference from the process flow of FIG. 14 is that a process for the path setting of "BRIDGE" is added to the process branch to be taken according to the 1×4 WSS optical path information.

When the path setting is BRIDGE, the node supervisory unit 131 of D station checks the field of the internal optical fiber destination direction 335 corresponding to the line of the stored FDI alarm, based on the OSC alarm information management table 330A for "Direction 1" in the OSC alarm indication information storage unit. Then, the node supervisory unit 131 of D station transmits the FDI alarm to the direction stored in the particular field of the internal optical fiber destination direction 335 (S207). Here, the information of "Direction 2" is stored in the corresponding line of FIG. 17, so that the FDI alarm of λ1 is inserted into the optical switch unit of the direction 2. Then, the node supervisory unit 131 of D station masks the λ1 LOS alarm of the direction 2 (S208). The node supervisory unit 131 of D station checks the field of the transponder destination location 336 corresponding to the line of the stored FDI alarm, based on the OSC alarm information management table 330A for "Direction 1" in the OSC alarm indication information storage unit 133. Then, the node supervisory unit 131 of D station masks the LOS alarm generated in the transponder stored in the particular field of the transponder destination location 336 (S209).

As described above, one path setting state of "BRIDGE" is added to the states of "optical path management information" of the first embodiment. Then, the alarm indication process flow with the path setting of "BRIDGE" is added to the existing flows. In this way, even for the optical cross-connect apparatus supporting multicast, it is possible to effectively perform the alarm indication process of the FDI alarm or other alarms, and possible to mask the LOS alarm spread other than the factor alarm.

What is claimed is:

1. An optical cross-connect apparatus comprising:
   a 1×N wavelength selective switch for each of N directions;
   an N×1 wavelength selective switch for each of the N directions; and
   a node supervisory unit which supervises all N directions,
   wherein the node supervisory unit includes an alarm indication information storage unit for storing information about path setting of the 1×N wavelength selective switch, an output direction of the 1×N wavelength selective switch, and a connection destination of the 1×N wavelength selective switch, and
   wherein, upon receiving an FDI alarm, the node supervisory unit refers to the alarm indication information storage unit and transfers the FDI alarm to a different node.

2. The optical cross-connect apparatus according to claim 1, wherein, upon receiving the FDI alarm, the node supervisory unit refers to the alarm indication information storage unit and masks an LOS alarm received from the outside.

3. The optical cross-connect apparatus according to claim 1,
   wherein, upon receiving the FDI alarm, the node supervisory unit refers to the alarm indication information storage unit to determine whether a direction from which the FDI alarm is received is set to THROUGH or DROP, and
   wherein the node supervisory unit masks the LOS alarm with respect to a direction according to a result of the determination.

4. The optical cross-connect apparatus according to claim 1,
   wherein, upon receiving the FDI alarm, the node supervisory unit refers to the alarm indication information storage unit to determine whether the direction from which the FDI alarm was received is set to THROUGH, and
   wherein, when the direction from which the FDI alarm was received is set to THROUGH, the node supervisory unit masks the LOS alarm with respect to another direction than the direction from which the FDI alarm was received.

5. The optical cross-connect apparatus according to claim 1,
   wherein, upon receiving the FDI alarm, the node supervisory unit refers to the alarm indication information storage unit to determine whether the direction from which the FDI alarm was received is set to DROP, and
   wherein, when the direction from which the FDI alarm was received is set to DROP, the node supervisory unit masks the LOS alarm generated in the connection destination, based on information about the connection destination of the 1×N wavelength selective switch.

6. The optical cross-connect apparatus according to claim 1,
   wherein, upon receiving FDI alarm, the node supervisory unit refers to the alarm indication information storage unit to determine whether the direction from which the FDI alarm was received is set to BRIDGE,
   wherein, when the direction from which the FDI alarm was received is set to BRIDGE, the node supervisory unit masks the LOS alarm with respect to another direction than the direction from which the FDI alarm was received, and
   wherein, based on information about the connection destination of the 1×N wavelength selective switch, the node supervisory unit also masks the LOS alarm generated in the connection destination.

* * * * *